(12) United States Patent
Karis et al.

(10) Patent No.: US 7,849,447 B1
(45) Date of Patent: Dec. 7, 2010

(54) APPLICATION TESTING AND EVALUATION

(75) Inventors: George Demetrios Karis, Cambridge, MA (US); Michael S. Heinrichs, Ottawa (CA); Timothy Gar Wai Ho, Arlington, MA (US)

(73) Assignee: Verizon Laboratories Inc., Waltham, MA (US)

( * ) Notice: Subject to any disclaimer, the term of this patent is extended or adjusted under 35 U.S.C. 154(b) by 1001 days.

(21) Appl. No.: 11/282,708

(22) Filed: Nov. 21, 2005

(51) Int. Cl.
*G06F 9/44* (2006.01)
*G06F 11/00* (2006.01)

(52) U.S. Cl. .................. 717/125; 717/126; 717/135; 714/38; 714/100

(58) Field of Classification Search ......... 717/124–135; 714/38, 100
See application file for complete search history.

(56) References Cited

U.S. PATENT DOCUMENTS

| | | | |
|---|---|---|---|
| 6,810,494 B2 * | 10/2004 | Weinberg et al. | 714/46 |
| 7,461,385 B2 * | 12/2008 | Winter | 719/328 |
| 2005/0229043 A1 * | 10/2005 | Nasuti et al. | 714/38 |
| 2006/0143595 A1 * | 6/2006 | Dostert et al. | 717/127 |

OTHER PUBLICATIONS

Elbaum, Sebastian. "Improving Web Application Testing with User Session Data". IEEE. 2003; pp. 49-59.*
Elbaum, et al., "Improving Web Application Testing with User Session Data", IEEE, 2003, 10pg.*
Steven et al., "jRapture: A Capture/Replay Tool for Observation-Based Testing", ACM, 2000, 9pg.*
Tullis et al. article entitled "An Empirical Comparison of Lab and Remote Usability Testing of Web Sites".

* cited by examiner

*Primary Examiner*—Wei Y Zhen
*Assistant Examiner*—Ryan D Coyer

(57) ABSTRACT

A system includes a first application that is the subject of a test. A log of information relates to use of the first application. At least one data file relates to the first application. A second application conducts the test based at least in part on the log and the data file. A method includes generating test data based on an analysis of the log of information relating to use of the first application, analyzing the at least one data file relating to the first application, and conducting the test based at least in part on the test data and the at least one data file.

21 Claims, 5 Drawing Sheets

125 

```
            <?xml version="1.0"?>
            <!DOCTYPE study SYSTEM "http://test.testpages.com:8080/test/test.dtd">
            <study collectData="true" payment="false">
310  ─────▶ <section name="Yellow Pages Searches on SuperPages.com" randomOrder="true">
320a ─────▶ <task id="map-based-dinner" href="http://www.superpages.com">
                     <radioquestion id="SuperPagesSearch">
                            You're interested in going out to dinner and then a movie,
                            and you also need to buy some non-prescription medicine.
                            Search in a nearby city using Map-Based search to find out
                            whether you can find three businesses within walking distance
            330a         to satisfy these needs.
                            <br><br>
                            Were you successful?
                            <option>yes</option>
                            <option>no</option>
                     </radioquestion>
            </task>
320b ─────▶ <task id="spanish-category-state" href="http://espanol.superpages.com">
                     <radioquestion id="SuperPagesSearch">
                            Using Spanish SuperPages.com do a statewide search by category.
            If you can't read Spanish, click the "explorador" link next to Categoria on the search form, choose a
            category, and then choose a state using the pull-down menu.
            330b           <br><br>Were you successful?
                            <option>yes</option>
                            <option>no</option>
                     </radioquestion>
            </task>
            . . .
320c ─────▶ <task id="business-misspell-city" href="http://yp.superpages.com">
                     <radioquestion id="SuperPagesSearch">
                            Search for a business by name in {citystate}. Misspell the business
            name to see whether the system can recover from this error.
            330c           <br><br>Were you successful?
                            <option>yes</option>
                            <option>no</option>
                     </radioquestion>
            </task>
320d ─────▶ <task id="category-misspell-city" href="http://yp.superpages.com">
                     <radioquestion id="SuperPagesSearch">
                            Search for a business by keyword in {citystate}. Misspell the
            keyword to see whether the system can recover from this error.
            330d           <br><br>Were you successful?
                            <option>yes</option>
                            <option>no</option>
                     </radioquestion>
            </task>
            </section>
```

Fig. 3

APPLICATION TESTING AND EVALUATION

BACKGROUND INFORMATION

As applications presented via the world wide web have grown more and more complex in recent years, the problem of managing, maintaining, and testing such applications has grown more and more difficult. For example, many web sites presently offer such rich and varied functionality that it is difficult to test adequately an application or applications offered on the web site before making the application available to users. Similarly, the richness and depth of functionality offered by many such applications makes it difficult to train users to use them. Those managing and developing web applications are faced with the challenge of ensuring that such applications not only function according to their design, but that the web applications have been designed to be useable. Further, web application developers and managers are often faced with the challenge of determining how their web application compares to those offered by peers or competitors.

Products for managing, testing, and providing training for, web applications are presently available. Various companies, for example, Mercury Interactive Corporation of Mountain View, Calif., provide products that automate the process of testing software applications including web applications. These products work to ensure that new site changes do not break existing functionality. However, there is no guarantee that such products will comprehensively test or evaluate a web application. For one thing, the information provided by such products is highly dependent on the human beings who configure them. Moreover, it is rarely possible for a testing or evaluation product to be kept up to date with respect to the myriad of changes that frequently—often, daily—take place on many complex web sites. Accordingly, testing configurations presently are often very inflexible, and require a great deal of effort to implement and maintain. In sum, present testing and evaluation products often fail to detect significant quality issues with the web applications being tested and/or evaluated.

Failures to detect quality issues concerning major web sites occur despite the fact that most major web sites are regularly tested and/or evaluated by multiple groups of people, including people responsible for software quality assurance (QA), software and web site developers, marketing personnel, and/or user interface (UI) evaluators. Many web sites also receive feedback from users who encounter errors or usability issues. In addition, automated programs of the type discussed above may be in frequent, even daily, use. Moreover, many web site administrators review entries in web logs to identify and interpret error codes, although such entries are typically cryptic, and often meaningless without a visual representation of the error. In general, neither human testers and/or evaluators, nor automated programs, presently make systematic and structured use of information generated by a web application itself that may suggest areas of functionality that should be tested and/or evaluated. Thus, both humans and automated programs lack ways of systematically, in a structured, organized manner, identifying all or even most of the quality issues, including certain significant quality and/or usability issues, which are likely to present themselves to users.

Accordingly, there is a need for a web application testing and evaluation tool that uses information recorded and/or generated by the web site itself. Such a tool would advantageously provide information regarding usability and/or quality issues that would provide for more efficient maintenance and upgrading of the web application. Such a tool would advantageously pinpoint issues requiring user training, in addition to facilitating the methodical and structured training of users with respect to features and functions where such training is most needed. Moreover, such a tool would advantageously allow for issues that are difficult or impossible to detect by an automated process (e.g., finding listings in a directory that are practically duplicates but not character-for-character identical) to nonetheless be systematically analyzed.

BRIEF DESCRIPTION OF THE DRAWINGS

FIG. 2A shows a first view of a graphical user interface (GUI) of a test application according to an embodiment.

FIG. 2B shows a second view of a graphical user interface (GUI) of a test application according to an embodiment.

FIG. 3 shows an exemplary portion of a test specification included within such a file.

DETAILED DESCRIPTION OF THE PREFERRED EMBODIMENTS OVERVIEW

Figure 1:
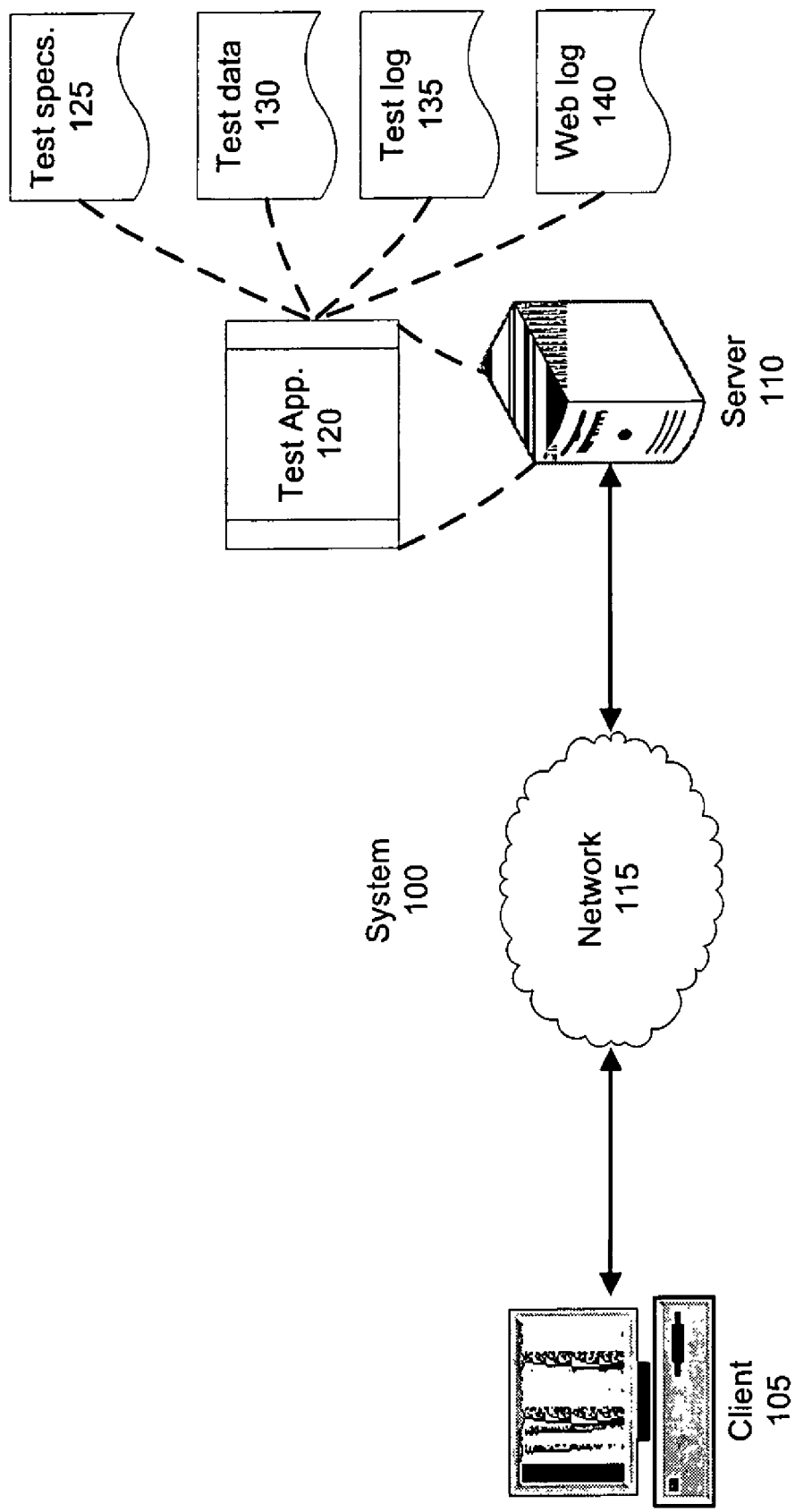
FIG. 1 is a block diagram of a system that includes a client computer that communicates with a server computer via a network, according to an embodiment.

FIG. 1 is a block diagram of a system 100 that includes a client computer 105 that communicates with a server computer 110 via a network 115 (e.g., a LAN, WAN, the Internet, etc.), according to an embodiment. It should be understood that, although. FIG. 1 depicts a single client 105, embodiments are possible, and likely, in which the system 100 includes more than one client 105. Similarly, embodiments are possible, and likely, in which the system 100 includes more than one server 110, and/or in which server 110 works in conjunction with other computers, e.g., web servers, database servers, file servers, application servers, etc., although such additional computers are not shown in FIG. 1.

Client 105 may be any one of a number of computing devices known to those skilled in the art, including, without limitation, a desktop, notebook, laptop, or handheld computer, or some other computing device known to those skilled in the art, such as a Java-enabled cellular telephone or similar device. Similarly, server 110 may be any of a number of computing devices known to those skilled in the art, including, without limitation, a desktop, notebook, laptop, or server computer, although those skilled in the art will recognized that, for complex applications, highly-trafficked web sites, etc., a scaleable computer system is preferable to fulfill the functions of server 110.

In general, client 105 and server 110, as well as any other computing devices used to implement the systems and methods described herein, may be any one of a number of computing devices known to those skilled in the art, and may employ any of a number of computer operating systems known to those skilled in the art, including, but by no means limited to, known versions and/or varieties of the Microsoft Windows® operating system, the Unix operating system, and the Linux operating system. For example, in one presently practiced embodiment, server 110 employs the Solaris operating system distributed by Sun Microsystems of Menlo Park, Calif. Client 105 generally includes web browser software known to those skilled in the art. Server 110 generally includes web server and/or application server software known to those skilled in the art, and generally works with a relational database management system (RDBMS) as known to those skilled in the art. The RDBMS software may be located on server 110, but those skilled in the art will understand that often it is preferable for the RDBMS to be located on one or more separate computing devices.

In general, those skilled in the art will recognize that the various systems and methods described herein may be implemented as instructions executable by one or more computers such as client 105 and server 110. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Test application 120 generally includes computer executable instructions stored on a computer readable medium included in, or accessible by, server 110. Such instructions may be written in a variety of programming languages known to those skilled in the art according to various embodiments, including, without limitation, and either alone or in combination, Java™, C++, Visual Basic, Java Script, Perl, etc. Test application 120 generally accesses test specifications 125, test data 130, test logs 135, and web logs 140, all of which are stored on one or more computer readable media included in, or accessible by, server 110, and each of which is discussed in more detail below.

Graphical User Interface

Figure 2A:
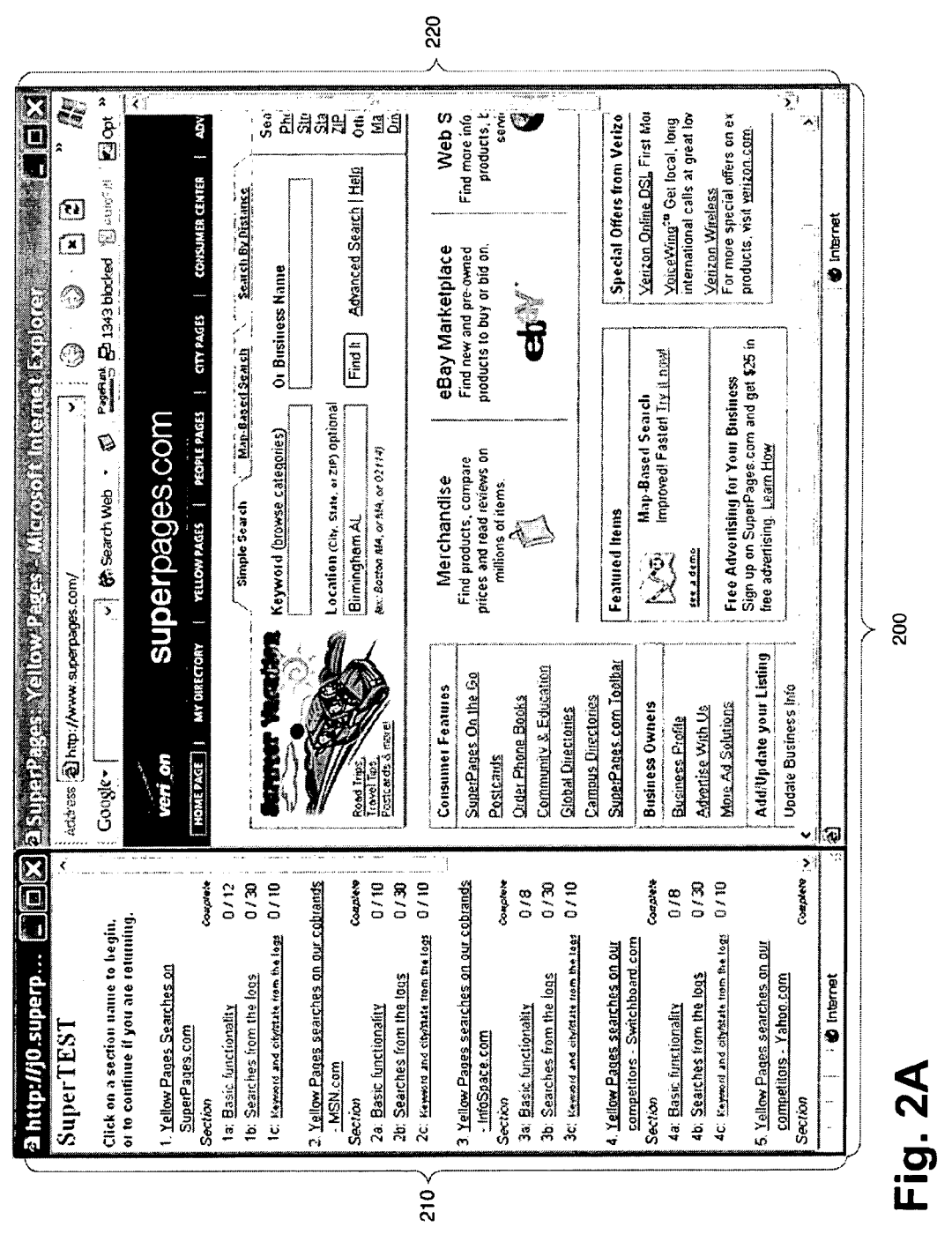

FIG. 2A shows a graphical user interface (GUI) 200 of a test application 120 according to an embodiment. As can be seen, test navigation window 210 includes links such as hypertext markup language (HTML) links to different sections of a test to be performed. Generally, as will be clear from the description that follows, such sections may be completed separately or in conjunction with other sections. Selection of links in test navigation window 210 causes the display, in test subject window 220, of a web page whose functionality is to be tested. Thus, windows 210 and 220 display output from two separate applications, with window 210 related to a first application and providing information for, and collecting feedback from, tests of a second application, e.g., a web site, displayed in window 220.

One or more test specifications 125 are usually stored in a text file or, preferably, a script file such as an eXtensible Markup Language (XML) file. FIG. 3 shows an exemplary portion of a test specification 125 included within such a file, in this embodiment an XML file. Test specification 125 is used for, among other things, populating information into test navigation window 210. Accordingly, while the portion of a test specification 125 shown in FIG. 2A includes one section tag 310, it should be clear from test navigation window 210 shown in FIG. 2 that a test generally, although not necessarily, includes a plurality of sections.

Figure 2B:
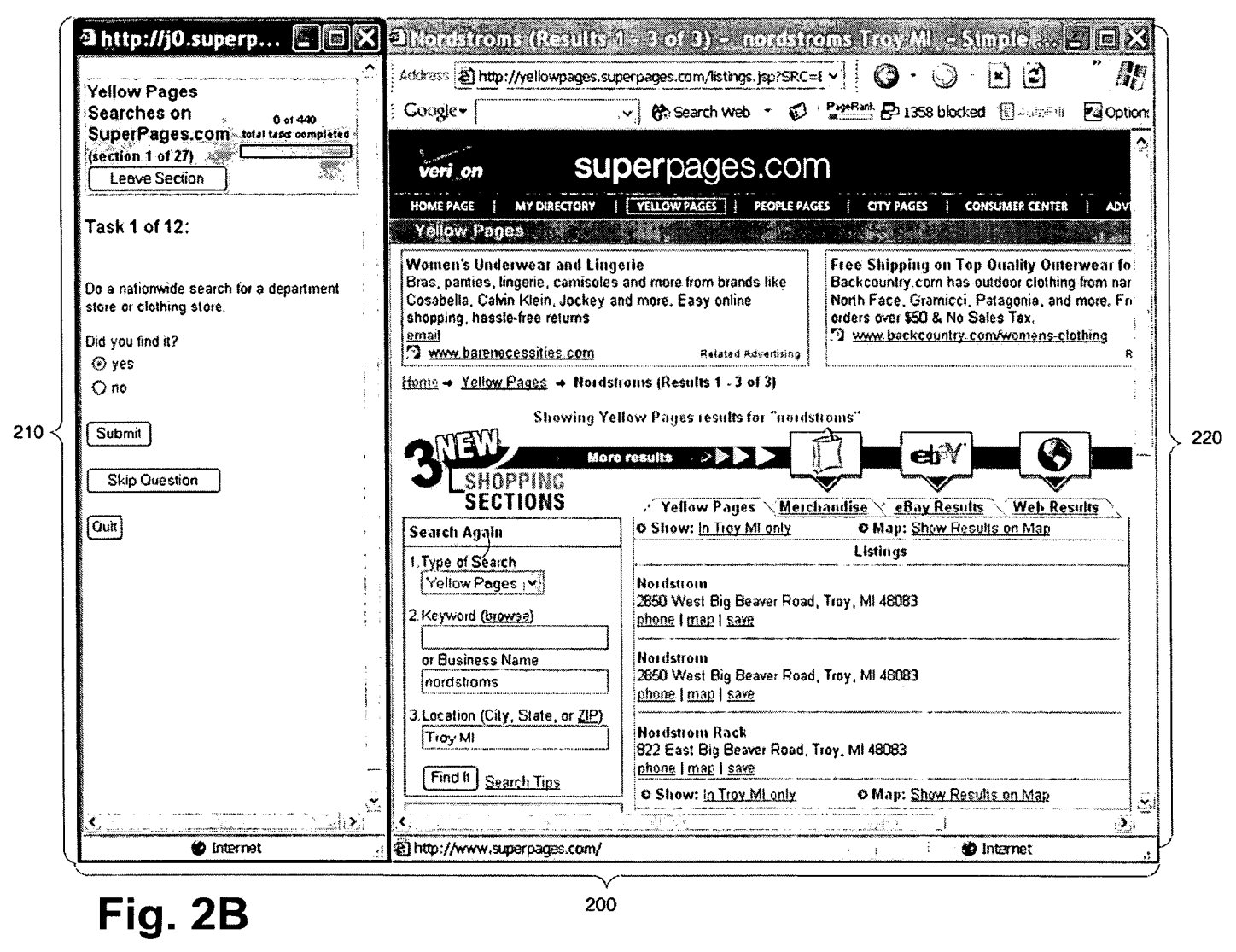

Task tag 320 identifies a task to be performed within a test section, and also usually specifies an address such as a uniform resource locator (URL) of a web page whose functionality is to be tested according to the task definition 330 corresponding to the task tag 320. For example, selecting a link in test navigation window 210 as shown in FIG. 2A may result in test navigation window 210 and test subject window 220 appearing as shown in FIG. 2B. As seen in FIG. 2B, test navigation window 210 may be configured to provide the user with instructions regarding steps to take or functionality to test in the web page displayed in test subject window 220. As is further seen in FIG. 2B, test navigation window 210 may be configured to include a form by which a user may provide feedback concerning the results of testing functionality in the web page displayed in the test subject window 220. It is to be understood that a form included in test navigation window 210 may include any element or elements known to those in the art, including checkboxes, radio buttons, drop down list boxes, text fields, etc.

Returning to FIG. 3, task definition 330 provides user instructions regarding functionality to be tested, as well as a definition of a form by which a user may provide feedback. Accordingly, test application 120 may be programmed to read information from test specification 125 to populate test navigation window 210, as well as to select an address of a web page to be displayed in test subject window 220.

There are several different types of data that may be used in a task definition 330 in various embodiments. Often, as is the case with task definitions 330a and 330b, all elements of a task definition 330 are "hard-coded" into a task specification 120. However, in some embodiments, a test specification 125 may include data that is dynamically retrieved, generally on random basis, from a file or database containing test data 130. For example, task definition 330c states "Search for a business by name in {citystate}." In this embodiment, the notation "{citystate}" constitutes a directive to test application 120 to randomly retrieve a {city, state} pair from a file of test data 130 containing a list of city, state pairs (e.g., Chicago, Ill.; Detroit, Mich.; Washington, D.C.; etc.).

Similarly, in some embodiments, one or more task definitions 330 include instructions to search for information related to a "{category}" of business, wherein the notation "{category}" constitutes a directive to test application 120 to randomly retrieve a business category from a file of test data 130 containing a list of business categories (e.g., restaurants, banks, pharmacies, shoes, apparel, pawnshops, electronics, auto dealerships, libraries, etc.).

To take a further example, in some embodiments, one or more task definitions 330 include instructions to "Search for {0} "{1}" in {2}." Such a task definition 330 constitutes a directive to test application 120 to randomly retrieve search information from a file of test data 130 containing a list of data triplets that include (1) a type of search data (e.g., category, business name, etc.), (2) a key word or keywords to be used for a search, and (3) a location to be searched (e.g., a city, state pair). Table 1 shows an example of data triplets contained in a file of test data 130 according to one embodiment.

TABLE 1

| | | |
|---|---|---|
| Business Name | William Ryan Homes | Tampa, FL |
| Category | Restaurants | Yuba City, CA |
| Business Name | Fleurie | Charlottesville, VA |
| Category | Dance | Fort Lauderdale, FL |
| Business Name | Restoration Realty Llc | Exton, PA |
| Category | Christian Book Stores | Pontiac, MI |
| Business Name | Bill's Diner | Concord, NC |
| Category | Escort | Philadelphia, PA |
| Business Name | Estes Trucking | Piscataway, NJ |
| Category | Flowers | Medford, MA |
| Business Name | K-mart | Gambrills, MD |
| Category | Shopping | Minneapolis, MN |
| Business Name | Lucy's Lounge | Pleasantville, NY |
| Category | Car Audio | Oahu, HI |
| Business Name | Porkey's | Stanwood, WA |
| Category | Bank | Hiram, GA |

Accordingly, task definitions 330 such as those mentioned earlier in this paragraph might result, for example, in the statement "Search for Category 'Restaurants in Yuba City, Calif." being displayed in test navigation window 210.

A novel and advantageous aspect of the presently disclosed embodiments is that information included in test data 130 may be randomly determined by reference to files containing, for example, lists of categories or city, state pairs to be searched, or, alternatively, such information may be drawn from a web log 140 containing information about the use of a web site or web application to be tested or evaluated with test application 120. For example, it may be desirable to test a web search application to determine the operability of features and functions actually used by persons accessing the web site. Accordingly, a web log 140 that has recorded actions taken by users may be analyzed to determine which features and functions can be so tested.

Because, as those skilled in the art will understand, web log 140 may be quite large and may be difficult for humans to read, it is preferable that the analysis of web log 140 be automated as much as possible. Accordingly, test application 120 or some other application may be configured to search web log 140 and retrieve information to be included in test data 130. In one embodiment, for example, one or more scripts written in Perl, a scripting language known to those skilled in the art, are used to analyze web log 140 to retrieve information to be included in test data 130. These scripts identify lines in web log 140 that contain relevant information by parsing the request field of each line. By analyzing the uniform resource locater (URL) parameters in a request field, the script can identify what kind of request was made to server 110, and hence whether or not the line is going to be included in test data 130. Those skilled in the art will understand that a request field in a web log will include the URL that a user was attempting to access, and that the URL may include parameters indicating, for example, a user's request for information such as a search request. For example, requests based on geography information, or for categories of businesses, provide information for test data 130 in many embodiments. If the information from a line in web log 140 is to be included, the script will parse out parameters and their values from the request field to be included in test data 130 (e.g., city=Chicago; state=Illinois).

For example, it may be desirable in a web search application to test search functions actually used by persons using the search application. Accordingly, frequently performed searches may be extracted from web log 140 and included in test data 130. Such extraction is generally conducted according to some predefined criterion, e.g., extract the top 20 searches, rank order the searches according to frequency and extract the top one percent, extract the top 20 keyword searches but ignore business name searches, etc. Thus, test application 120 may advantageously be used to ensure the proper operation of a web site according to functions and features actually used by persons visiting the web site.

To take another example, the importance of studying user actions, such as searches, that occur with high frequency and therefore reflect the majority of user experiences, will be understood. However, to comprehensively test a web site, it is not sufficient to sample from only high frequency searches. Accordingly, other techniques are needed to obtain a wide range of searches from the web log 140. For instance, if search terms are ranked, then it can be useful to sample web log 140 for high frequency, medium frequency, and low frequency searches. For example, the top 100 searches could be defined as high frequency, searches ranked 500 to 1,000 could be defined as medium frequency, and 3,000 to 5,000 could be defined as low frequency. Note that the example increases the number of searches to sample from as it moves to lower frequency searches, because diversity increases as frequency decreases. Those skilled in the art will understand that a Perl script may be used to sample for searches occurring with various frequencies.

To take yet another example of how information from a web log 140 can be gathered for test data 130, it is possible, generally using a Perl script or some similar programmatic mechanism, to scan web log 140 to find lines that contain error codes. The request field mentioned above can be parsed to identify the kind of request that caused the error. Thus, test application 120 may aid in understanding why users encounter errors on a web site. Such errors could be related to data, functionality, or usability issues within the web site, etc.

Further, when analyzing a web log 140 to populate test data 130, sometimes one request by itself does not provide sufficient information to understand the purpose of a user's action on a web site. However, what a user does before and after a particular action, e.g., a search, may lend insight into what the user was trying to accomplish. Accordingly, some embodiments use unique session identifiers and timestamps from each line in web logs 140 to group each line with unique users forming web sessions. By grouping lines according to web sessions, test data 130 may be created so that test application 120 can be used essentially to recreate a user's session. Thus, a user of test application 120 will obtain insight into why certain actions were taken on a web site, what the user experience is with respect to such actions, what usability issues exist, etc.

Process Flow

Figure 4:
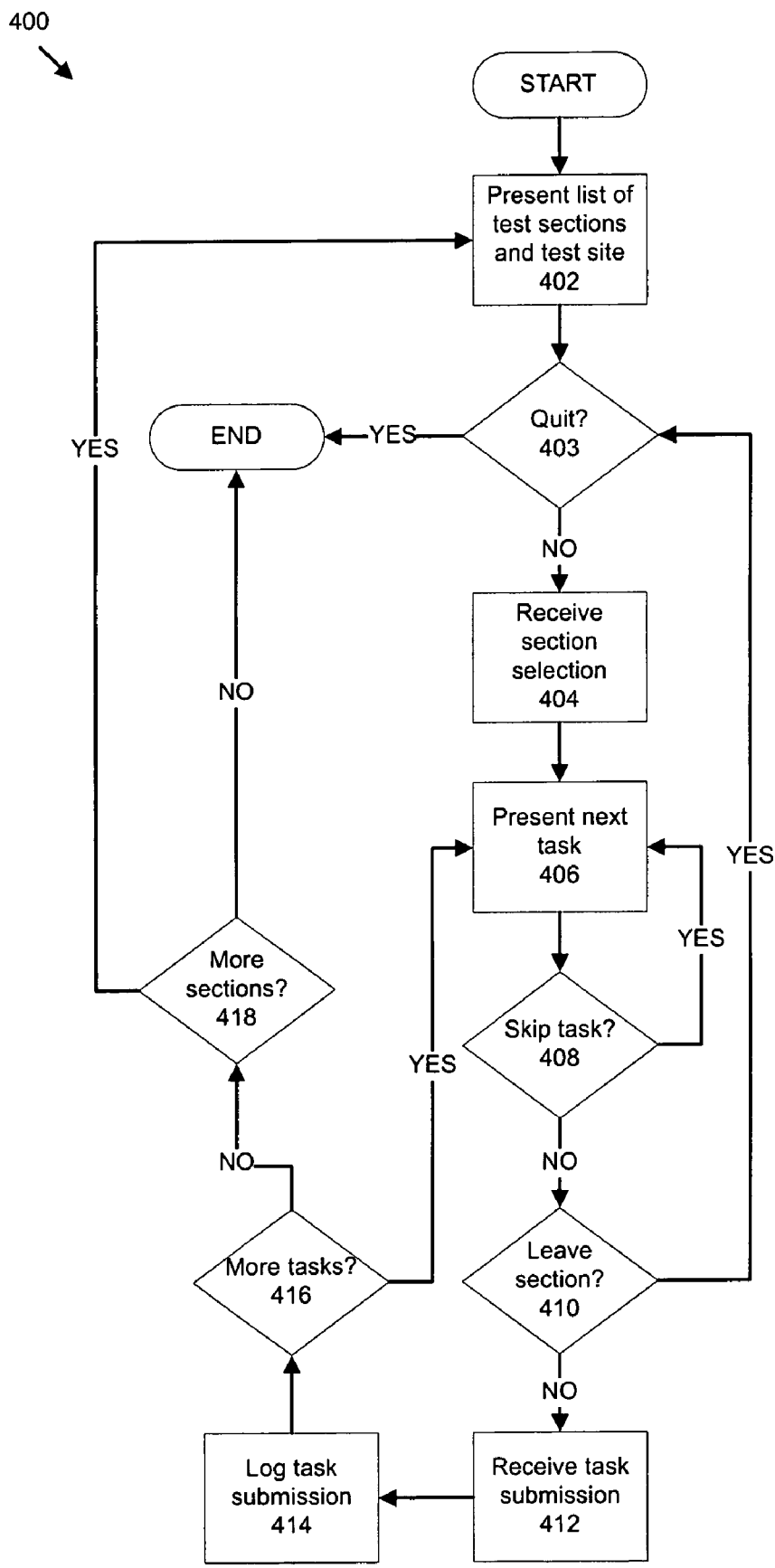
FIG. 4 illustrates a process flow 400 for test application 120, according to an embodiment.

FIG. 4 illustrates a process flow 400 for test application 120, according to an embodiment.

In step 402, a user having initiated test application 120, window 210 is opened displaying a list of test sections that include particular testing tasks to be performed by the user. It should be understood that test specifications 125, accessed by test application 120, are used to determine and present testing tasks to be performed by the user, e.g., as described above. Testing tasks and sections are discussed above with reference to FIGS. 2A, 2B, and 3. Further, window 220 is opened displaying a web site to be tested. Control then proceeds to step 403.

In step 403, test application 120 determines whether input has been received from a user to quit the application 120. If yes, the process 400 ends. Otherwise, control proceeds to step 404.

In step 404, test application 120 receives an input from the user indicating a test section to be performed. In many embodiments, this selection is received by the user's selection of an HTML link, as discussed above. Control next proceeds to step 406.

In step 406, test application 120 presents the next, or first, if step 406 is being visited for the first time, task in the section selected in step 404. Test data 130, as described above, may be used to present specific tasks in the selected section. Control next proceeds to step 408.

In step 408, test application 120 determines whether input has been received from a user to skip the task presented in step 406. If yes, in the embodiment illustrated in FIG. 4, control returns to step 406, although in other embodiments control proceeds to step 416. Otherwise, control proceeds to step 410.

In step 410, test application 120 determines whether input has been received from a user to leave the section selected in step 404. If yes, in the embodiment illustrated in FIG. 4, control returns to step 403, although in other embodiments control returns to step 402. Otherwise, control proceeds to step 412.

In step 412, test application 120 receives the user's submission of information relating to the result of performing the task presented in step 406. This submission may be received via any mechanism known to those skilled in the art, including via a form as discussed above. Next, control proceeds to step 414.

In step 414, test application 120 logs the information submitted in step 412 in a test log 135 and/or web log 140. Test log 135 may be used to store user responses to tasks and/or requests for information. For example, the task presented in step 406 may ask the user to perform a search using a certain application presented on the world wide web. It is then desirable for test application 120 to collect information from the user, e.g., an answer to the questions "Did your search results include what you were looking for?" "Did you find this web site easy to use?" and/or "Will you use this site again?" etc. It will be understood that use of test log 135 is beneficial, but not absolutely necessary for the functioning of test application 120. Web log 140, in contrast, generally contains information automatically generated by server 110 and placed in web log 140 in a manner understood by those skilled in the art. It is to be understood that the web log 140 used in step 414 may or may not be the same log 140 from which information is drawn for test data 130 as described above. Following step 414, control proceeds to step 416.

In step 416, test application 120 determines whether more tasks in the section presented in step 404 remain to be performed by the user. If so, control returns to step 406. Otherwise, control proceeds to step 418.

In step 418, test application 120 determines whether more sections in the list of sections presented in step 402 remain to be visited by the user. If so, control returns to step 402. Otherwise, the fact that the user completed the test may be noted in test log 135, and the process 400 ends.

CONCLUSION

With regard to the processes, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes described herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the field of application testing and evaluation, and that the disclosed systems and methods will be incorporated into such future embodiments. Further, although embodiments described herein refer to web applications, it should be understood that embodiments applied to other kinds of computer and/or software applications will be within the scope and spirit of the presently claimed invention. Accordingly, it should be understood that the invention is capable of modification and variation and is limited only by the following claims.

We claim:

1. A system, comprising:
   at least one server configured to access a first application that is the subject of a test;
   a log of information relating to use of the first application, wherein said log of information is accessible by at least one of said at least one servers;
   at least one data file relating to the first application, wherein said at least one data file is accessible by at least one of said at least one servers and includes a test specification and test data, the test data including information determined from said log of information; and
   a second application configured to retrieve data from the data file based on the information stored in the log and conduct the test based at least in part on the log and the data file,
   wherein said test specification includes a directive for the second application to dynamically retrieve data from the test data,
   wherein a first and a second graphical user interface (GUI) respectively for the first and the second application are provided substantially concurrently for side-by-side display to a user, the second GUI being provided based on instructions in the test specification, and
   wherein a user may select a link in the second GUI to display a page from the first application in the first GUI, and wherein a request is received from the user when the user enters the request into the displayed page according to instructions displayed on the second GUI.

2. The system of claim 1, wherein at least a portion of the at least one data file is at least in part automatically populated.

3. The system of claim 2, wherein a plurality of requests in the log are analyzed to identify at least one of: a set of requests that have been submitted, a frequency of a user action, a user web session, and an indication of an error, thereby at least in part automatically populating the at least one data file from data in the log.

4. The system of claim 3, wherein the requests include at least one of a category selection and a geography selection.

5. The system of claim 1, further comprising a test log that includes information about the test.

6. The system of claim 1, further comprising a server computer that includes at least one of the first application and the second application.

7. The system of claim 6, further comprising a client computer that communicates with the server computer via a network.

8. The system of claim 1, wherein the first application is a web application.

9. A system, comprising:
at least one server configured to access a first application that is the subject of a test;
a log of information relating to use of the first application, wherein said log of information is accessible by at least one of said at least one servers;
test data that is at least in part automatically populated from data in the log by analyzing a plurality of requests in the log to identify at least one of: a set of requests that have been submitted, a frequency of a user action, a user web session, and an indication of an error;
a test specification that includes a directive to dynamically retrieve data from the test data; and
a second application configured to retrieve the test data based on the information stored in the log and conduct the test based at least in part on the log, the test specification including the directive, and the test data;
wherein a first and a second graphical user interface (GUI) respectively for the first and the second application are provided substantially concurrently for side-by-side display to a user, the second GUI being provided based on instructions in the test specification, and
wherein a user may select a link in the second GUI to display a page from the first application in the first GUI, and wherein a request is received from the user when the user enters the request into the displayed page according to instructions displayed on the second GUI.

10. The system of claim 9, wherein the first application is a web application.

11. A method, comprising:
creating at least one data file from at least one of a test specification and test data, the test specification being in the form of executable instructions on a computer-readable medium;
generating the test data based on an analysis of a log of information relating to use of a first application, the log stored in a memory;
including in the test specification a directive that may be used to dynamically retrieve data from the test data;
analyzing at least one data file relating to the first application;
conducting a test based at least in part on the test data and the at least one data file;
wherein conducting the test is performed using a second application separate from the first application, wherein at least one of the first application and the second application are executed by a server;
wherein a first and a second graphical user interface (GUI) respectively for the first and the second application are provided substantially concurrently for side-by-side display to a user, the second GUI being provided based on instructions in the test specification, and
wherein a user may select a link in the second GUI to display a page from the first application in the first GUI, and wherein a request is received from the user when the user enters the request into the displayed page according to instructions displayed on the second GUI.

12. The method of claim 11, further comprising at least in part automatically populating at least a portion of the at least one data file.

13. The method of claim 12, further comprising identifying, from a plurality of requests in the log, at least one of: a set of requests that have been submitted, a frequency of a user action, a user web session, and an indication of an error, thereby at least in part automatically populating the at least one data file.

14. The method of claim 13, wherein the requests include at least one of a category selection and a geography selection.

15. The method of claim 11, further comprising generating a test log that includes information about the test.

16. The method of claim 11, further comprising accessing at least one of the first application and the second application via a client computer that communicates with the server via a network.

17. A processor-readable medium tangibly storing instructions executable by a processor and configured to cause the processor to perform the method of claim 11 when executed by the processor.

18. The system of claim 1, wherein said second application is configured to search said log of information to retrieve the information to be included in the test data.

19. The system of claim 9, wherein said second application is configured to search said log of information to retrieve the information to be included in the test data.

20. The method of claim 11, further comprising searching the log of information with a second application for information to be included in the test data.

21. The system of claim 1, wherein at least a portion of the entered request is saved to the log.

* * * * *